United States Patent [19]
Sellnau et al.

[11] Patent Number: 5,329,809
[45] Date of Patent: Jul. 19, 1994

[54] NON-INTRUSIVE CYLINDER PRESSURE SENSOR

[75] Inventors: Mark C. Sellnau, Bloomfield Hills, Mich.; Robert G. Plyler, Vienna, Ohio; Andrew F. Rodondi, Sharpsville, Pa.

[73] Assignee: General Motors Corporation, Detroit, Mich.

[21] Appl. No.: 50,796

[22] Filed: Apr. 22, 1993

[51] Int. Cl.$^5$ .................... G01L 23/32; G01M 15/00
[52] U.S. Cl. ............................ 73/115; 73/35; 123/425; 123/435
[58] Field of Search ............ 73/35, 115, 116, 117.3; 123/494, 425, 435

[56] References Cited

U.S. PATENT DOCUMENTS

| | | | |
|---|---|---|---|
| 2,068,744 | 1/1937 | Gutzke | 73/35 |
| 4,483,181 | 11/1984 | Maekawa et al. | 73/35 |
| 4,570,097 | 2/1986 | Shukla et al. | 73/754 |
| 4,601,196 | 7/1986 | Frelund | 73/115 |
| 4,602,506 | 7/1986 | Sawamoto et al. | 73/115 |
| 4,660,409 | 4/1987 | Miyata et al. | 73/35 |
| 4,964,294 | 10/1990 | Kawajiri et al. | 73/35 |
| 4,969,352 | 11/1990 | Sellnau | 73/115 |
| 5,142,914 | 9/1992 | Kusakabe et al. | 73/115 |
| 5,195,365 | 3/1993 | Chujo et al. | 73/115 |

*Primary Examiner*—Hezron E. Williams
*Assistant Examiner*—George M. Dombroske
*Attorney, Agent, or Firm*—Vincent A. Cichosz

[57] ABSTRACT

A cylinder pressure sensor of the annular insert type disposed within an access well to measure the flexure of a first wall relative to a second wall along a response axis has low-cost components thereof requiring only simple sequential assembly in axial stacked fashion providing contaminant protection and electrical shielding of the sensing element.

10 Claims, 3 Drawing Sheets

NON-INTRUSIVE CYLINDER PRESSURE SENSOR

BACKGROUND OF THE INVENTION

This invention relates to internal combustion engine cylinder pressure sensors, more particularly a non-intrusive sensor of the "annular insert" type which measures flexure of a first wall defining in part a cylinder relative to a second relatively rigid wall of an internal combustion engine housing component. Such a sensor is disclosed in U.S. Pat. No. 4,969,352 to Sellnau and assigned to the assignee of the present invention. In the disclosure of that patent such a Sensor finds particular utility when mounted in a spark plug access well.

It is known in the field relating to internal combustion engines to utilize cylinder pressure sensors for monitoring and controlling various processes, among them being combustion knock, misfire and associated combustion dilution and combustion phasing. Delivery of fuel and exhaust gas recirculation and timing of ignition may then be optimized accordingly. In order for cylinder pressure sensing to find its way into the mainstream of commercial automotive applications, it must be cost effective. Advances to making pressure sensing cost effective have been made as shown in Sellnau wherein simple modifications to pre-existing engine head features provide necessary mounting provisions for non-intrusive sensors. Another way to advance cost effectiveness is by reducing piece price. This is especially true where multiple sensors (i.e. one per cylinder) are to be used in a single vehicle. Therefore, innovative designs which reduce piece price by simplifying manufacturing and assembly are highly favored.

Sellnau '352 shows a sensor having a castellated lower portion effective to allow axial compressive forces to act on a trapped sensing element while bypassing torsional loads around the load sensing element. Another approach accomplishing the same is also shown wherein an integral axial extension from the major portion of the annular insert extends downward therefrom and is bent in an outward flange arrangement to trap the sensing element between the flange portion and the major portion of the annular insert. Such arrangements accomplish the objective of bypassing torsional loads around the sensing element, however, they also leave the sensing element and electrical connections exposed to infusion of such common deleterious materials as oil, road salt and water. Additionally, such arrangements are relatively complex and costly and may not be necessary where the sensing element can sufficiently cope with the torsional loads expected. It is desirable to simplify sensor packaging and ensure that the sensing element and electrical connections are adequately shielded from electromagnetic interference and sealed against contaminant infusion.

In order to obtain a signal from such a sensor it is necessary to electrically couple to the sensing element. One approach shown in related art cylinder pressure sensors provides for electrical coupling to each of two sides of a piezoelectric sensing element by electrodes or metal traces attached thereto, thereby requiring at least two sensor leads and providing an engine ground-isolated sensor with a differential signal. Reducing the number of lead wires and simplifying electrical coupling to a single-ended configuration would reduce failure modes, increase reliability and may decrease the complexity of overall engine dress wiring. Also, the sensor signal would not be subject to stray capacitive effects precipitated by engine ground noise. For these reasons, it is desirable to simplify electrical coupling including reducing the number of lead wires.

It is possible in such an arrangement that significant noise may be induced upon the high impedance sensor from the high voltage ignition system. This is particularly true where a spark plug access well is the location of choice for such a sensor. It is therefore desirable to reduce noise induced upon the pressure sensor by the high voltage ignition system components proximate thereto.

SUMMARY OF THE INVENTION

According to the present invention there is provided a non-intrusive internal combustion engine cylinder pressure sensor disposed within an access well such as conventionally used for a spark plug in an engine head. The sensor is disposed between a first wall and a second wall of the engine head and is responsive to flexure of the first wall relative to the second wall. The first wall defines at least part of a cylinder and flexes in response to changing pressure therein. The second wall is relatively rigid and remote from direct combustion induced flexure and forms a reference against which flexure of the first wall is measured.

Structurally, the sensor takes the general form of an annular insert having an axially stacked arrangement of component parts which provides assembly and manufacturing advantages. A cylindrical metal sleeve is formed to provide a concentric channel within which an annular sensing element is contained, sealed and shielded. A mounting shell with fastening threads is piloted within the channel, and the sleeve projects the length of the sensor at the inner diameter. Thus, the sensing element is confined on all sides in a prophylactic arrangement. The arrangement provides electrical shielding to diminish effects of the high voltage ignition wires passing through the center of the sensor body. The mounting shell is threadably engaged to the second wall of the engine head, the bottom of the sleeve is engaged with the first wall, and the sensing element is thereby compressively engaged and preloaded therebetween.

In a preferred example, the annular mounting shell is structurally affixed to the outer wall of the channel to form a seal around the entire perimeter effective to eliminate contaminant infusion to the sensing element via the interface. An axial conduit through at least a portion of the mounting shell provides access from the top of the mounting shell to its base at the sensing element. An annular bonnet is stacked on top of the mounting shell with the cylindrical sleeve extending through its center and beyond its top. The bonnet has an axial finger depending therefrom and through the conduit so as to provide an electrical carrier for coupling to the top side of the sensing element. Contaminant seals are established at the interface between the bonnet and mounting shell and at the interface between the bonnet and sleeve such that contaminant infusion to the sensing element is prevented. Electrical coupling from the bottom of the sensing element to engine ground is established through the bottom of the channel. The sleeve is rolled outwardly over the top of the bonnet for axial retention of the component parts thereby completing assembly of the sensor.

These and other features and advantages of the invention will be more fully understood from the following description of certain preferred embodiments taken together with the accompanying drawings.

DETAILED DESCRIPTION OF THE PREFERRED EMBODIMENT

Figure 1A:
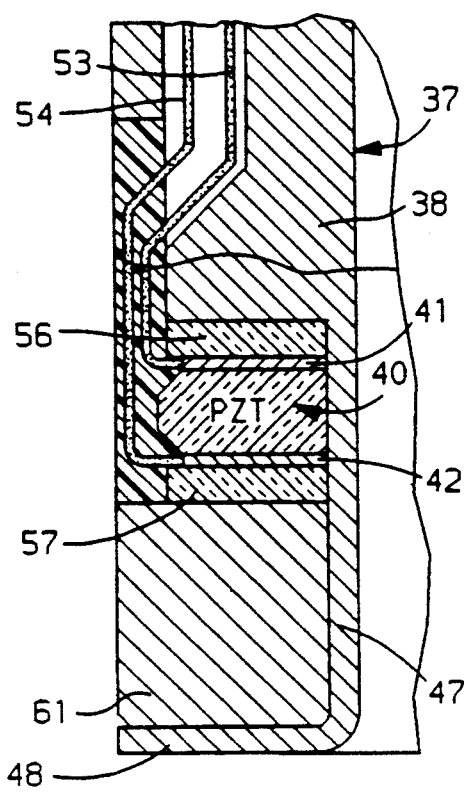
FIGS. 1a through 1c show views of two embodiments of related art annular insert type sensors improved upon according to the present invention.
Figure 1B:
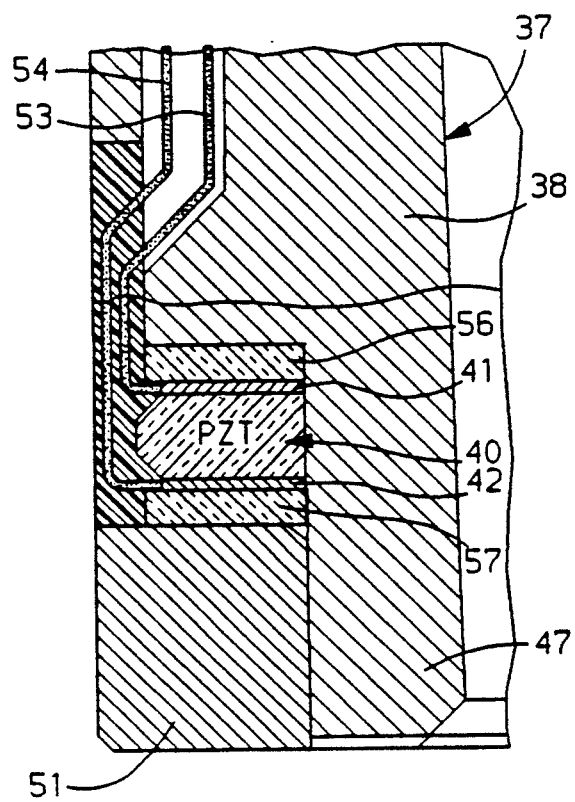
Figure 1C:
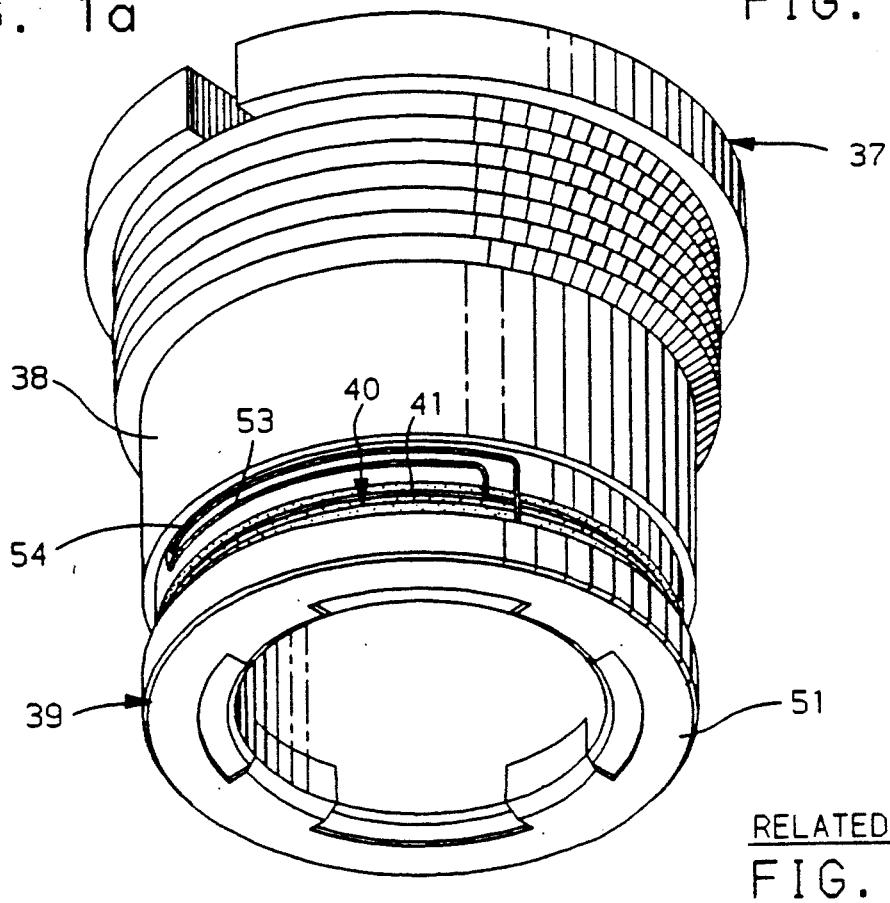

Referring first to FIGS. 1a-1c, related art cylinder pressure sensors of the type comprising an annular insert as the main body portion of a sensor are shown. Major portions of two specific embodiments disclosed in U.S. Pat. No. 4,969,352 to Sellnau and assigned to the assignee of the present invention are indicated by specific numerals with similar features between FIGS. 1a-1c similarly numbered. A cylinder pressure sensor of the annular insert type operates to produce a signal indicative of cylinder pressure by responding to the flexure of an inner wall comprising a portion of the cylinder relative to an outer wall which is substantially rigid and removed from influence of cylinder pressure. Generally, a load sensing element having an annular shape is disposed at a bottom portion of the annular sensor body so as to be responsive to compressive forces at a lower portion of the sensor body interfaced with a portion of the first wall of a cylinder. The embodiments illustrated in partial cross-sections of related art sensors (FIGS. 1a and 1b) show similar arrangements wherein sensing element 40 having an annular shape is trapped between upper portion 38 of sensor body 37 and retaining ring 61 or 51 respectively. Annular sensing element 40 is radially restrained due to lower portion 47 extending from upper portion 38 of sensor body 37 through the inner radius of annular load sensing element 40.

The embodiment shown in FIG. 1a has a substantially annular retaining ring 61 at the base of sensor body 37 which effectively traps annular sensing element 40 between upper portion 38 of sensor body 37 and itself. Lower portion 47 which prevents radial movement of sensing element 40 is shown to be rolled outwardly over retaining ring 61 at 48 thereby providing axial retention of sensing element 40. A pair of electrical leads 53,54, one for each side of sensing element 40, is shown coupled to sensing element 40 at 41 and 42 respectively. Leads 53 and 54 are routed to the top of sensor body 37 via annular and axial channels. Annular insulators 56,57 are shown at the top and bottom respectively of sensing element 40 to prevent shorting to sensor body 37.

One embodiment of related art sensors, shown in FIGS. 1b and 1c, has lower portion 47 of sensor body 37 castellated. Retainer ring 51 is likewise castellated to mate thereto. Rotational movement therebetween is thereby eliminated so as to bypass torsional loads around sensing element 40 while at the same time trapping sensing element 40 between upper portion 38 of sensor body 37 and retainer ring 51.

Figure 2:
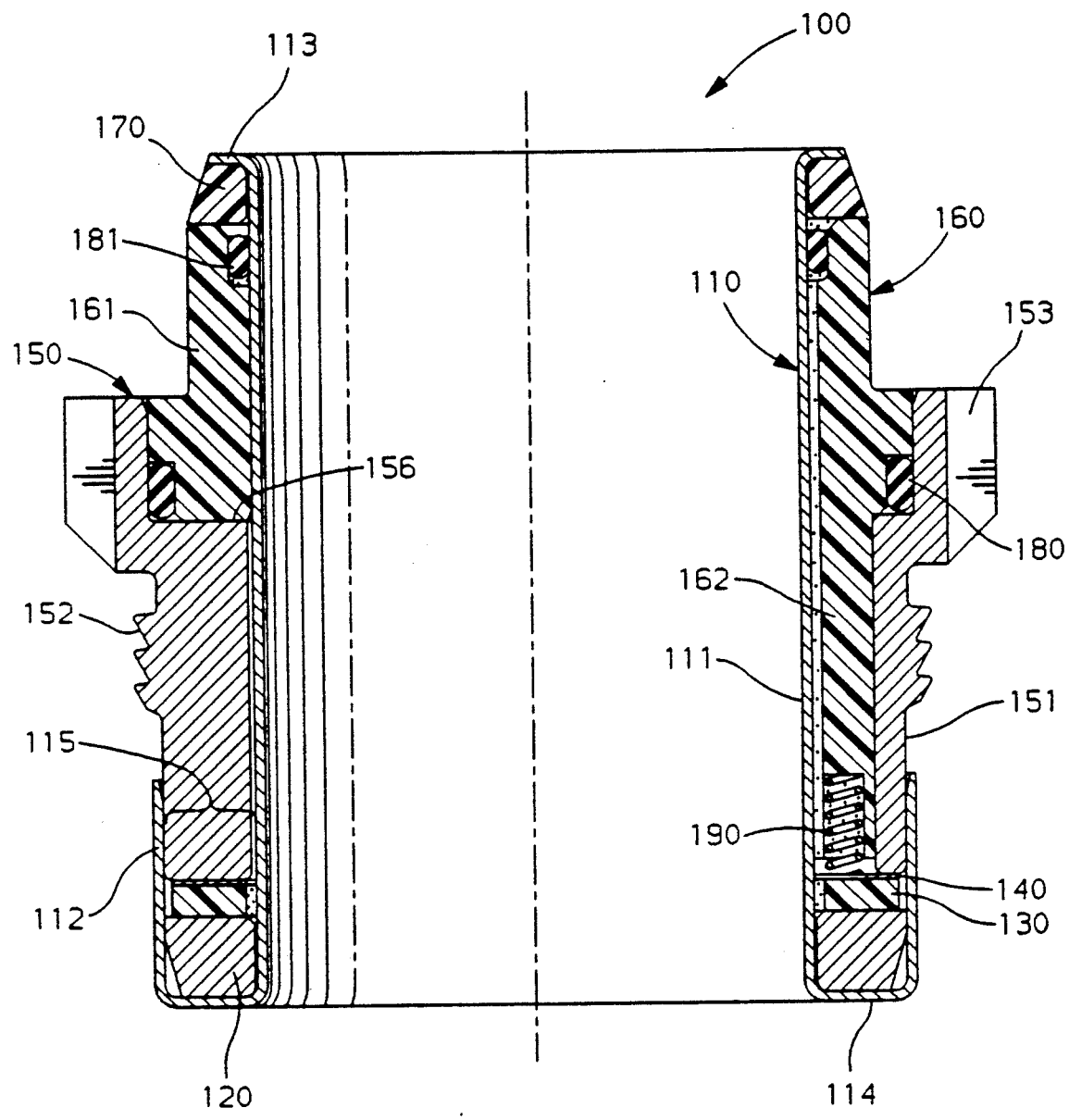
FIG. 2 shows a cross sectional view of a preferred embodiment of a cylinder pressure sensor according to the invention.
Figure 3:
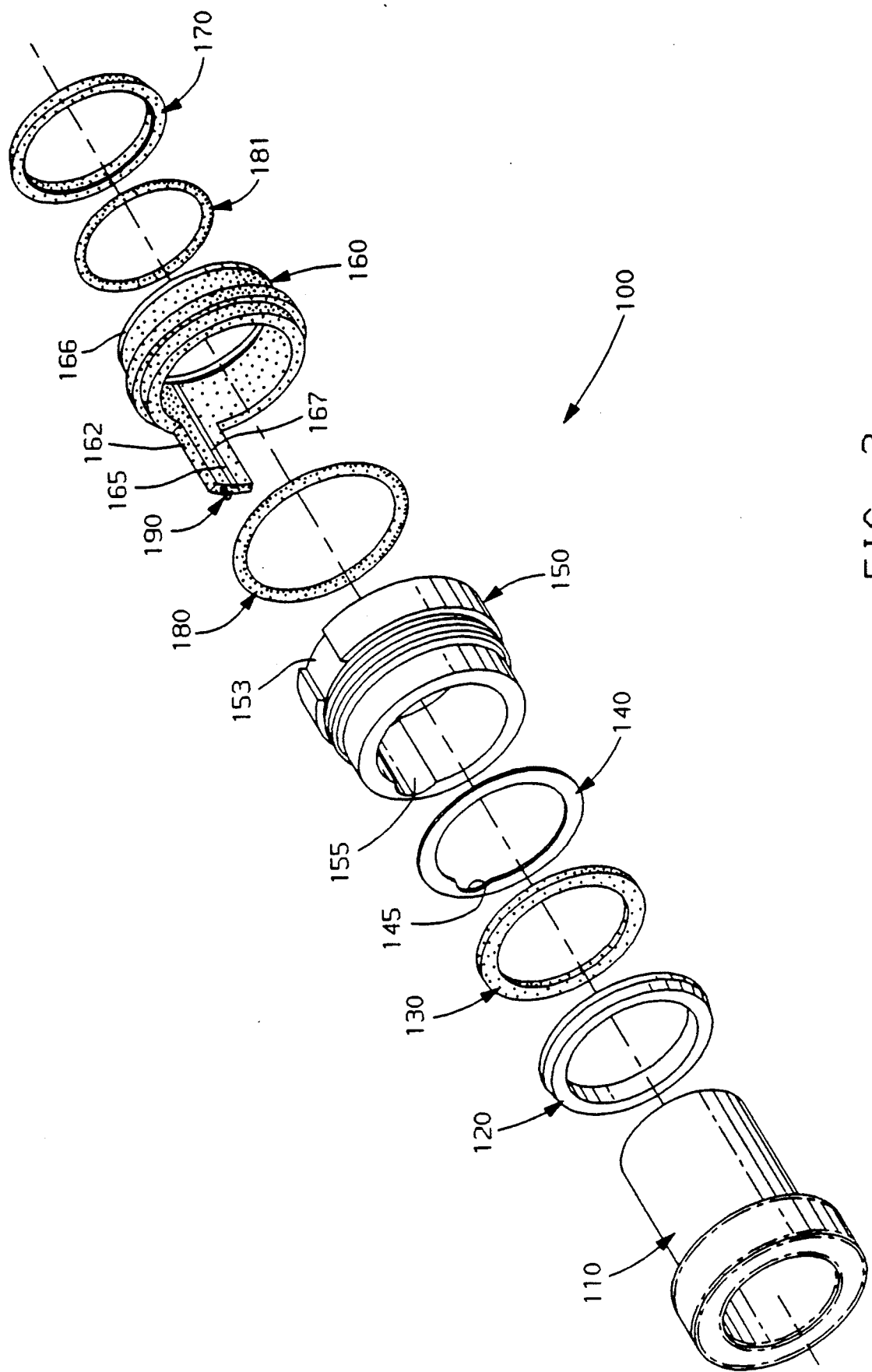
FIG. 3 shows a disassembled view of a preferred embodiment of a cylinder pressure sensor illustrative of piece assembly advantages in accordance with the present invention.

FIGS. 2 and 3 are illustrative of a preferred embodiment according to the present invention of an annular insert-type sensor functional in a similar manner to measure cylinder pressure via flexure of a first wall defining in part a cylinder relative to a second wall substantially rigid and removed from cylinder pressure. FIGS. 2 and 3 will be described with reference to component parts comprising the entire cylinder pressure sensor and in an order reflecting logical component piece assembly so as to adequately demonstrate certain advantages of the current inventive design. Sleeve generally designated by numeral 110 and channel 115 are preferably deep drawn using transfer die methods from 3004 aluminum sheet stock or equivalently ductile, weldable and strong aluminum alloy. Channel 115 is shown defined between lower inner wall 111 and lower outer wall 112. A deep drawn process as described is desirable for its low cost and high volume capabilities.

Washer 120 is sized to slip over sleeve 110 and fit into channel 115. Washer 120 is preferably manufactured from 6061-T6 aluminum alloy or an equivalently hard aluminum alloy and is treated such as with a corrosion preventative film (chromic conversion coating) as typically utilized for electrical and electronic applications where low resistance contacts are required. Military specification MIL-C-5541E, Class 3 has been followed to coat washer 120 in the present invention. Inner and outer diameter dimensions of washer 120 correspond substantially to the inner dimensions of channel 115 so as to span substantially all of the radial space therein; however, tolerances should be such that the bottom surface of washer 120 will contact the trough of channel 115. Sensing element 130 similarly has an annular shape and is disposed over sleeve 110 to fit inside channel 115 on top of washer 120. Preferably, sensing element 130 is comprised of a piezoceramic material capable of withstanding compressive stresses on the order of 2000–3000 pounds per square inch at maximum temperatures of 150° Celsius without excessive degradation. Additionally, the piezoceramic is plated on both contact surfaces to ensure adequate electrical contact thereto. From this assembly it can be seen that the bottom surface of sensing element 130 is grounded to the engine cylinder head through washer 120 and lower contacting surface 114 of sleeve 110. Electrically insulative washer 140, sized to fit within channel 115 atop sensing element 130, has a substantially annular shape and covers the entire upper surface of sensing element 130 with the exception of a small area 145 necessary to establish electrical contact with the upper surface of sensing element 130. The material used for insulative washer 140 should be able to withstand temperatures characteristic of the sensor's intended location. Suggested exemplary materials include polyamide and polyester films such as DuPont Kapton TM and Mylar TM respectively. The sleeve in addition to providing assembly and containment advantages provides electrical shielding of sensing element 130 surrounded thereby.

The next major portion in the sensor assembly is annular mounting shell 150 which has lower annular portion 151 which fits within channel 115 and is mated with an interference fit around the perimeter of lower outer wall 112. Lower annular portion 151 is advantageously tapered slightly to aid in its piloting within channel 115. Preferably, a continuous laser weld provides the preferred method of joining the lower outer wall 112 to lower annular portion 151 since a weld provides high degree of structural integrity and is an excellent barrier against contaminant infusion. Alternatives such as epoxies or other adhesives or mechanical couplings are also available. Annular mounting shell 150 comprises the main sensor structure. Annular mounting shell 150 has axial conduit 155 from its lower surface interface with insulative washer 140 through to an upper portion thereof. Preferably, as illustrated most clearly in FIG. 3, axial conduit 155 takes the form of a groove or channel open toward the inner surface of mounting shell 150. The purpose of the axial conduit is to allow for electrical access to the top surface of sensing element 130. As such, the opening at the bottom surface of annular mounting shell 150 established by the conduit substantially aligns with the small area 145 of washer 140 not covering sensing element 130. An upper portion of annular mounting shell 150 has threads 152 for engagement to the rigid second wall of the cylinder head not influenced by cylinder combustion forces. Further, above threads 152, annular mounting shell 150 preferably extends outward to a larger radius so as to provide enough material to form at least two diametrically opposing notches 153 used for applying torque to assembled sensor 100 for installation and preloading. Inner shoulder 156 is bounded by the larger radius portion and provides a seat for bonnet 160. Mounting shell 150 preferably is machined from 4032-T651 or 2219-T851 aluminum alloy, both of which exhibit desirable weldability. Mounting shell 150 can be screw machined from extruded stock or from cold formed parts. Axial conduit 155 is conveniently drilled on an automatic multi-spindle screw machine to minimize any additional parts handling which would be necessary if an alternative conduit was formed by slotting or broaching on a separate machine. Threads 152 can similarly be cut on the same screw machine thus greatly reducing manufacturing complexity relative to related art annular insert type sensors. To prevent galling of the threads, a file-hard anodic coating or electrolysis nickel coating is established on the shell depending upon the shell material and compatibility of the coating therewith.

Generally, annular shaped bonnet 160 has an upper portion sized for proximally surrounding an upper portion of sleeve 110 with a lower surface thereof in contact with inner shoulder 156 of annular mounting shell 150. Annular bonnet 160 has integral finger 162 which is substantially shaped to fit within axial conduit 155 of annular mounting shell 150. Finger 162 extends substantially the entire distance from the lower surface of upper portion 161 to the top surface of sensing element 130 with a small gap provided between the bottom of finger 162 and the top surface of sensing element 130. Annular bonnet 160 is preferably injection molded from well known resins compatible with metal traces to be disposed thereon. One exemplary resin is Radel TM, available from Amoco Performance Products Inc. FIG. 3 shows metal trace 165 in electrical contact with contact 190 and running the entire length of finger 162 continuing on the inner surface of upper portion 161 and terminating as outer annular contact ring 166 on the outside of upper portion 161 of annular bonnet 160. The portion of metal trace 165 at the inner surfaces of bonnet 160 is preferably disposed within shallow channel 167 so as to avoid coupling to sleeve 110. The portion of metal trace 165 taking form of annular contact ring 166 on the outer surface of upper portion 161 of annular bonnet 160 provides for external connection thereto. Annular contact ring 166 provides for a simplified non-indexed electrical connection and is preferred. A substantially cylindrical body is to be mated over the outer surface of bonnet 160 with a spring loaded contact arrangement to couple annular contact ring 166. The advantageous placement of the sensor assembly, and especially bonnet 160, away from extreme heat such as that experienced by intrusive sensors allows incorporation of low-temperature grade electronics within or on bonnet 160.

At the base of finger 162 is disposed electrical contact 190 which is preferably a compressive spring like member. Electrical contact 190 may take the form of a simple stamped, formed, or rolled contact disposed at the base of finger 162. Alternatively, contact 190 may take the form of a simple coil spring disposed within a bore at the bottom of finger 162 as illustrated in FIGS. 2 and 3. At an interface between annular mounting shell 153 and annular bonnet 160 is a conventional rubber O-ring 180 which provides for sealing therebetween to prevent infusion of contaminants at that interface. Additionally, a similar rubber O-ring 181 is disposed toward the top of upper portion 161 of annular bonnet 160 between annular bonnet 160 and sleeve 110. This likewise provides sealing between part interfaces to prevent infusion of contaminants. Finishing ring 170 is disposed on the top of annular bonnet 160 and a top portion of sleeve 110 is rolled thereover using a conventional cold forming or crimping process to retain all component parts of sensor assembly 100. Ring 170 comprises a non-electrically conductive material such as a plastic or resin similar to material used for annular bonnet 160.

The teaching of a preferred embodiment above may suggest various modifications and variations of the present invention. It is therefore to be understood that within the scope of the appended claims the present invention may be practiced otherwise than as specifically described.

The embodiments of the invention in which an exclusive property or privilege is claimed are defined as follows:

1. In an internal combustion engine, a cylinder pressure sensor disposed between a first wall and a second wall of an engine component housing and axially responsive to flexure of the first wall relative to the second wall, comprising in combination:
   a substantially cylindrical sleeve with a terminal end thereof being outwardly upwardly cupped to define an annular channel, the annular channel having a bottom portion thereof substantially normal to the sleeve for engagement with the first wall;
   an annular load sensing element disposed within the annular channel;
   a substantially cylindrical mounting shell having a lower portion nested within said annular channel and in communication with the sensing element, an upper portion for engagement with the second wall, and an axial conduit therethrough;
   a substantially cylindrical annular bonnet having a top portion and a finger depending axially therefrom, the annular bonnet top portion being stacked adjacent the mounting shell with the finger disposed within the axial conduit thereby providing a carrier for electrically conductive material to a terminal at the distal end of the finger; and
   means for sealing the sensing element from contamination.

2. A sensor according to claim 1 further comprising a compressibly yieldable contact for electrically coupling the sensing element and the electrically conductive material.

3. A sensor according to claim 2 wherein the yieldable contact comprises the terminal at the distal end of the finger.

4. A sensor according to claim 1 wherein the axial conduit is a groove open toward the interior of the mounting shell.

5. A sensor according to claim 1 further comprising an electrically conductive pattern disposed on the annular bonnet, the pattern having a runner portion coupled to the terminal and disposed axially on an inner surface of the finger and continuing axially along an inner surface of the top portion of the annular bonnet, and a terminal portion on an outer surface of the annular bonnet to define a cylindrical contact.

6. A sensor according to claim 5 wherein said inner surfaces of the annular bonnet are recessed thereby providing a gap between said electrically conductive pattern and any surfaces adjacent thereto.

7. A sensor according to claim 1 wherein the means for sealing the sensing element comprises a perimeter weld engaging the mounting shell to the terminal end of the cylindrical sleeve.

8. A sensor according to claim 1 wherein the means for sealing the sensing element comprises a perimeter weld engaging the mounting shell to the terminal end of the cylindrical sleeve and first and second O-rings, said first O-ring disposed between the mounting shell and annular bonnet, and said second O-ring disposed between the substantially cylindrical shell and the annular bonnet.

9. A sensor according to claim 1 wherein the annular bonnet further comprises an insulative carrier for sensor electronics.

10. In an internal combustion engine cylinder pressure sensor of the type having an annular insert and annular load sensing element, said sensor being disposed within an access well defined at least in part by an annular wall spanning a first wall and a second wall of an engine component housing and axially responsive to flexure of the first wall relative to the second wall, the improvement comprising:

said annular insert having an axially progressive assembly of components, said components including;

an electrically conductive annular sleeve with a terminal end thereof being outwardly upwardly cupped to define an annular channel, an electrically conductive washer disposed within the annular channel, an annular piezoceramic load sensing element disposed within the annular channel atop the load washer, an electrically insulative washer disposed within the annular channel atop the piezoelectric load sensing element, an annular mounting shell having an inner surface sized for proximally surrounding a portion of the annular sleeve, an upper portion for threadable engagement to said second wall and a lower portion disposed within the annular channel atop the insulative washer, the annular mounting shell further having an axial conduit from the upper portion to the lower portion thereof for electrical access to the sensing element, an electrically insulative annular bonnet having an inner surface sized for proximally surrounding a portion of the annular sleeve, an axial finger depending therefrom and disposed within the axial conduit to provide a carrier for electrically conductive material, the finger having an electrical contact at its distal end for compressive coupling to the sensing element, and means for axially and radially securing the annular mounting shell to the annular sleeve.

* * * * *